Nov. 21, 1972     F. C. ARRANCE     3,703,413
FLEXIBLE INORGANIC FIBERS AND BATTERY ELECTRODE
CONTAINING SAME
Filed Dec. 11, 1969

FRANK C. ARRANCE
INVENTOR.

BY *Max Gildin*

ATTORNEY

United States Patent Office
3,703,413
Patented Nov. 21, 1972

3,703,413
FLEXIBLE INORGANIC FIBERS AND BATTERY ELECTRODE CONTAINING SAME
Frank C. Arrance, Costa Mesa, Calif., assignor to McDonnell Douglas Corporation, Santa Monica, Calif.
Filed Dec. 11, 1969, Ser. No. 884,191
Int. Cl. H01m 35/00, 13/00
U.S. Cl. 136—6     23 Claims

ABSTRACT OF THE DISCLOSURE

Method of producing strong inorganic fibers such as zinc oxide fibers, by forming a mixture of inorganic particles such as zinc oxide, with a plastic binder such as polyphenylene oxide (PPO), in a flash drying solvent for the binder, such as chloroform, forming a slurry, and fiberizing the mixture as by spraying into a closed chamber, to flash the solvent and form fibers of the inorganic material containing plastic binder, such as zinc oxide fibers containing polyphenylene oxide; such coated fibers can be sintered, e.g. at temperature of the order of about 1000° C., if desired, to remove the organic binder or residue, and form strong sintered fibers. The resulting inorganic fibers, either unsintered or sintered, are particularly adapted to be incorporated into battery electrodes, e.g. by compacting zinc oxide unsintered or sintered fibers into an electrode shape, to provide a high strength porous, stable electrode structure.

---

Figure 1:
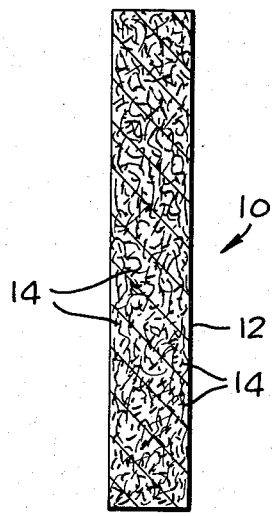

This invention relates to the production of essentially inorganic or inorganic fibers, and to battery electrodes embodying same, and is especially concerned with the provision of procedure for producing strong essentially inorganic or inorganic fibers, such as zinc oxide fibers, and the incorporation of such fibers into battery electrodes.

Batteries are an important source of energy storage for power generation. An important type of battery particularly suited for such applications are the high energy density alkaline electrolyte cells such as the silver-zinc, zinc-air and nickel-zinc batteries. High energy density batteries are generally battery systems which have a substantially higher energy per unit of weight than conventional, e.g., lead, storage batteries. In addition to important air-borne applications, such high energy density batteries have many other applications such as in portable tools and appliances, television, radio and record players, engine starting, portable X-ray units and the like.

In high energy density batteries such as silver-zinc batteries, the electrodes are placed adjacent opposite sides of a membrane or separator which performs the function of retaining electrolyte, separating the electrodes, and permitting transfer of electrolyte ions while preventing migration of electrode ions which short circuit the battery. For activation of these batteries, the battery or the components thereof such as the separator are filled with an aqueous alkaline electrolyte in the form of an aqueous solution of an alkali such as potassium hydroxide.

High energy density batteries of the above type, particularly those employing an inorganic separator, are particularly useful as secondary batteries which can be charged and discharged periodically, and can operate at elevated as well as at normal temperatures.

Zinc electrodes used e.g. in silver-zinc, nickel-zinc and zinc-air batteries are conventionally made by pasting zinc oxide to a metal screen or by compressing zinc oxide powder into a compact form or pellet. However, the physical integrity of such zinc electrodes is difficult to maintain at room temperature and is particularly difficult to maintain at temperatures of the order of 100° C. and above. Such zinc electrodes have relatively short life due to slumping of the paste mixture, or compressed powder, and electrochemical changes during charging and discharging, and such electrodes are not in the form of a strong disc or shape having a set geometrical physical form and structure. Thus, for example, even when such zinc electrode is placed directly in contact with the battery separator, slumping and segregation of the electrode material toward the bottom of the electrode compartment occurs, making it difficult to maintain good uniform contact between the zinc electrode and the separator, and also between the zinc electrode and the electrode collector screen, and causing changes in electrode characteristics.

In my copending application Ser. No. 847,332, filed Aug. 4, 1969, improved zinc electrodes are disclosed, formed of a sintered solid solution of a portion of the zinc oxide with another suitable oxide, such as zirconium oxide, the resulting zinc electrode thus comprising a combination of (a) a sintered solid solution of zinc oxide and the metal oxide additive, and (b) zinc oxide, the sintered solid solution (a) forming a substantially inert matrix for the zinc oxide (b) constituting the active electrode material.

In Patent No. 3,476,601 inorganic fibrous materials, such as fibrous potassium titanate, are incorporated as a support means in electrode materials, e.g. a zinc electrode, and the resulting mixture compacted to provide a zinc electrode of improved physical integrity.

The present invention constitutes a further improvement of the invention described in my above copending application and in the above patent, for producing a battery electrode, particularly a zinc electrode, of high strength, which is highly reactive, and forms a stable electrode structure which is of a porous nature and which retains electrolyte during cycling as a secondary battery, and which retains its capacity over a long period of charge-discharge cycling.

According to a feature of the invention, improved strong essentially inorganic fibers of good uniformity, and which are particularly advantageous for fabrication of battery electrodes, especially zinc electrodes, can be provided by a process which comprises mixing particulate inorganic material with a plastic binder in a flash drying solvent for such binder and forming a slurry, and fiberizing the mixture of inorganic material and plastic binder by flashing the solvent from a stream of the slurry, and forming fibers of the inorganic material containing the plastic binder.

The resulting fibers, e.g. zinc oxide fibers containing plastic binder such as polyphenylene oxide have utility per se, such as for fabrication of electrodes such as zinc oxide electrodes, or such fibers containing organic material can be sintered to remove the organic residue, leaving high strength inorganic fibers, which likewise are particularly advantageous for the fabrication of electrodes, e.g. the production of sintered zinc oxide fibers which can be fabricated into improved zinc oxide electrodes.

Briefly, the fiber forming process of the invention for preparing inorganic fibers is carried out by mixing preferably a small amount of a suitable plastic material or binder such as polyphenylene oxide together with the desired inorganic material, e.g. zinc oxide powder. A flash drying solvent for the plastic, such as chloroform, is then added as the vehicle and the viscosity of the resulting slurry is adjusted to the desired level. The resulting mixture or slurry of inorganic particulate or powder material, plastic binder and solvent is fiberized by any suitable means such as by use of an air spray gun, spinning wheel, airless atomizer, or the like. As the solvent instantly evaporates, strong flexible fibers are produced, the length and size, that is diameter, of the fibers being controlled principally by adjustment of the ratio of inorganic material to plastic binder, solvent ratio and rate of feed of the slurry to the fiberizing means.

Any suitable inorganic material can be fiberized according to the invention process, generally employing such inorganic material as starting material in the form of a fine powder, e.g. a 325 mesh powder. Thus, for example, particulate inorganic materials which can be employed include the titanates, such as potassium titanate, zirconia (zirconium dioxide), alumina, aluminosilicates, zinc oxide, beryllium oxide and $ZrO_2 \cdot SiO_2$. Also included are solid solutions in particulate form of zinc oxide with suitable metal oxide additives such as the oxides of the metals Zr, Sn, Ti, Cr, V, Co, Fe, Al, Ga, Y, Sc, Ni, Mn, La, Ce, Ba, Mg, Cu, Ag and Li. Such zinc oxide-additive oxide solid solution materials and their preparation are described in my above copending application Ser. No. 847,332. As noted therein, such solid solutions are produced by mixing, e.g. about 30 to about 99% zinc oxide and from about 1 to about 70% of the additive metal oxide, by weight, compacting such mixtures, and sintering same at temperatures ranging from about 600 to about 1400° C. to form a sintered solid solution. The resulting material is then ground to a fine powder form for use as the inorganic component of the fiberizing process of the present invention. Alternatively, the mixture of zinc oxide and additive oxide, e.g. zirconia, can be incorporated into the initial slurry, and following fiberizing of such slurry according to the present invention, the resulting fibers can be sintered to form fibers composed of a sintered solid solution of the zinc oxide and additive oxide.

Preferred inorganic materials for use in producing strong inorganic fibers according to the invention include zirconium dioxide, zinc oxide, and solid solutions of zinc oxide and oxide additives as noted above, especially a solid solution of zinc oxide and zirconium dioxide.

Generally, a major portion of particulate inorganic material is provided in the slurry, usually ranging from about 50% to about 90% by weight of total solids.

Any suitable plastic binder can be mixed with the above noted inorganic materials, which will bind the particles of inorganic material to form an integral fiber upon spraying of the slurry and rapid evaporation of the solvent. However, particularly where the initially formed fibers according to the invention are to be sintered, it is preferred to employ a high temperature resistant binder for reasons noted below. The preferred plastic binder for purposes of the invention is polyphenylene oxide. A representative material of this type is the material marketed by General Electric Company as "PPO" and understood to have a molecular weight ranging from about 25,000 to about 30,000. However, it is understood that such molecular weight range is only exemplary, and that polyphenylene oxide outside such range is also suitable for purposes of the invention. However, other plastic binders such as polysulfone, butadiene styrene rubber, neoprene and polystyrene also can be employed.

The ratio of plastic binder to inorganic material employed in the mixture can vary, preferably employing a small amount, that is a minor amount of plastic binder with respect to inorganic material. Generally, it has been found that a ratio of about 10 to about 50%, preferably about 10 to 30%, of plastic binder (including any plasticizer which also may be employed), by weight of total solids including inorganic material, is employed.

To the mixture of inorganic material and plastic binder there is added any suitable flash drying solvent such as chloroform, carbon tetrachloride, tetrachloroethylene, toluene, methyl ethyl ketone, and the like. The amount of solvent employed can vary, e.g. from about 50 to about 75% by weight of the total composition, that is the total mixture of inorganic material, plastic binder and solvent, the amount of solvent employed being sufficient to dissolve the plastic binder. If desired, the solvent can be added to the mixture of inorganic material and plastic binder and the mixture agitated to substantially dissolved the plastic binder in the solvent, or alternatively the solvent can be added first to the plastic binder to dissolve same, and the resulting solution of plastic binder added to the inorganic material.

As an optional although preferred feature, there is also added to the mixture or slurry of inorganic material, plastic binder and solvent, a plasticizer which functions to facilitate uniform fiberizing and the production of more uniform fibers, and aids to flexibilize the fibers. Preferred plasticizers for this purpose are the monomeric and polymeric azalate, pellargonate and oleate esters. These materials are incorporated in the above noted solvent with the plastic binder. The most desirable plasticizers of these types are the polyazelates, such as the polypropylene and polyethylene polyazelates, particularly the former, such polymers having an average molecular weight ranging from about 850 to about 6000. The above noted monomeric and polymeric azelates, pelargonates and oleates are marketed as "Plastolein." The proportion of the above monomeric or polymeric ester plasticizer present in the mixture thereof with the plastic binder, e.g. polyphenylene oxide, can vary but usually ranges from about 5% to about 50% by weight of such mixture.

The slurry of inorganic material, plastic binder, and also including plasticizer such as the above noted monomeric or polymeric ester, e.g. polyazelate, when employed, dissolved in the solvent, is preferably maintained in vibration to provide a substantially homogeneous slurry for feeding to the fiberizing means.

Generally, and in preferred practice, the essentially inorganic fibers according to the invention are formed by feeding the above noted slurry to an air spray gun and spraying the slurry directly into a closed chamber or container. In practice, a continuous supply of slurry is fed to the air spray gun and upon discharge from the gun the solvent instantly evaporates forming strong flexible, essentially inorganic fibers containing the organic components including the plastic binder, e.g. polyphenylene oxide, which binds the particles of inorganic material together, and the plasticizer when employed, such fibers being relatively uniform. The fibers produced are of a length generally up to about 1½ inches, and can range according to process conditions from about 0.050 to about 1½ inches, usually from about 0.050 to about 0.500 inch, and have a width or diameter generally from about 1 to about 20 microns, usually from about 2 to about 10 microns. Conditions can be chosen as desired with respect to slurry composition, solvent ratio and rate of feed to the spray means in order to obtain fibers of desired substantially uniform length and diameter.

As previously noted, and as illustrated in the examples below, such inorganic fibers containing the organic components can be employed per se in fabricating battery electrodes, e.g. zinc oxide electrodes. However, strong substantially uniform inorganic fibers substantially free of organic components or residue can be produced by subjecting the initially produced inorganic fibers containing organic components to sintering, e.g. at temperature ranging from about 400 to about 1200° C., to remove the organic components and organic residue, leaving the inorganic fibers, the latter fibers being of particular value in fabricating electrodes according to the invention. During heating of the fibers at temperature up to about 400° C., and prior to actual sintering the structure of the fibers is not destroyed because the high temperature binder such as polyphenylene oxide maintains the fiber matrix integral. As the temperature is further raised in the range of about 400 to about 450° C., the plastic binder continues to maintain integrity of the fiber structure while initial sintering occurs, building up the strength of the fibers, and in the temperature range of about 450 to about 600° C., during which sintering of the inorganic constituent progresses further the high temperature plastic binder is destroyed, at which point the sintered fibers are wel formed and maintain their shape.

The resulting sintered high strength inorganic fibers free of organic components have substantially the same components noted above, and have a degre of flexibility, although they are not as flexible as the initial unsintered fibers containing binder and plasticizer, if the latter is employed.

The nature and properties of the inorganic fibers produced according to the invention have been substantiated from photomicrographs of the fibers produced, and from electron microscope studies of the fibers.

According to a feature of the invention, unsintered or sintered zirconium oxide fibers, or unsintered or sintered zinc oxide-additive oxide, particularly zinc oxide-zirconium dioxide, solid solution fibers, produced as described above according to the invention, can be compressed to form highly improved zinc oxide electrodes and provide a highly reactive zinc oxide electrode structure having good capacity retention and capable of high rate discharge. The fibrous structure of the resulting zinc electrodes provides a porous, stable electrode structure which readily retains electrolyte during secondary cycling operation, and which does not dry out and become hard and lose capacity during cycling due to depletion of electrolyte within the electrode structure. Of particular significance, the fibrous nature of such zinc electrodes forms a support or matrix which inhibits slumping of the zinc electrode. Where the fibers employed contain plastic binder such as polyphenylene oxide, such plastic binder further provides a plastic matrix to support the electrode.

High strength inorganic fibers either unsintered and containing organic components, or sintered such as zirconia unsintered or sintered fibers, and produced according to the invention, can be incorporated with active electrode materials, such as zinc oxide in conventional form, e.g. zinc oxide powder, and the mixture of inorganic fibers and active electrode material compacted into electrodes which can be employed in batteries, particularly high energy density batteries. Addition of such inert inorganic fibers such as zirconia fibers of the invention, to zinc oxide electrode mixes provides a physical supporting network which holds the electrode mix in place during cycling of the battery, and prevents or inhibits slumping of the zinc electrode. As noted above, it is recognized that Pat. No. 3,476,601 describes and claims incorporation of conventional inorganic fibrous materials such as titanates and zirconia in an electrode matrix such as a zinc electrode matrix. However, the plastic binder-containing unsintered and the sintered inorganic fibers such as the potassium titanate and zirconia fibers produced according to the invention, having the high strength and uniformity characteristic of the inorganic fibers produced according to the invention process, when incorporated with active electrode materials such as zinc, not only provide a supporting network which aids in improving the strength and durability of the zinc electrode, but as result of the high uniformity of the fibers which can be produced according to the invention, the resulting fibrous matrix which holds the active electrode material such as zinc oxide, has more uniform porosity, permitting the electrode to retain electrolyte uniformly substantially throughout the entire electrode, and preventing local drying out of the electrode during cycling operation and increasing the durability and electrical performance of the electrode.

The improved inorganic fibers either containing plastic binder such as polyphenylene oxide and unsintered, or sintered, such as potassium titanate or zirconia fibers produced according to the invention, also can be incorporated with other active electrode materials such as silver, nickel, cadmium, and in fuel cell electrode structures such as platinum catalyst, to produce improved electrode structures of these types containing a fibrous matrix for supporting the active electrode material and obtaining the advantages according to the invention, including a strengthened electrode structure having substantially uniform porosity for retaining electrolyte and maintaining the electrode in a moist condition to thereby extend the life and improve the performance characteristics of such electrodes.

Figure 2:
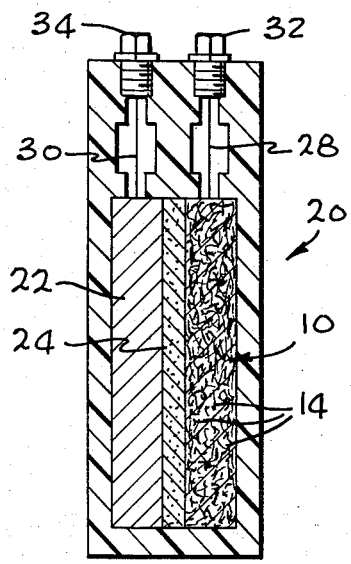

One or more electrodes embodying the essentially inorganic or inorganic fibers produced according to the invention, e.g. a zinc oxide electrode formed essentially from compacted zinc oxide unsintered or sintered fibers, can be incorporated in a battery such as a high energy density battery, with one or more counter electrodes or electrodes of opposite polarity, such as silver electrodes, and having a porous separator positioned between the electrodes of opposite polarity. If desired, both electrodes of opposite polarity, such as both the zinc and silver electrodes in a silver-zinc battery, can embody the essentially inorganic or inorganic fibers according to the invention. The invention will be more readily understood by the description below taken in connection with the accompanying drawing wherein:

FIG. 1 illustrates an improved electrode structure, e.g. a zinc electrode, produced employing zinc fibers obtained by the invention process; and FIG. 2 illustrates a battery embodying the improved zinc electrode of FIG. 1.

The drawings are exaggerated for purposes of clarity.

The zinc electrode illustrated at 10 in FIG. 1 of the drawing is thus composed of compacted and homogeneously distributed zinc oxide fibers, either unsintered and containing organic components or sintered, of high strength produced according to the invention process, forming a matrix indicated at 12, the inorganic zinc oxide fibers indicated at 14, being distributed essentially uniformly throughout the matrix.

Numeral 20 of FIG. 2 represents a battery of the high energy density type containing the improved zinc electrode 10 of FIG. 1 according to the invention, and a conventional silver electrode 22, with a separator 24, preferably an inorganic separator of the types described hereinafter, disposed between the electrodes 10 and 22. The zinc and silver electrodes 10 and 22, respectively, are connected by means of lead wires 28 and 30, to terminals 32 and 34, respectively, of the battery.

It will be understood, of course, that one or a plurality of zinc electrodes 10 can be employed together with one or a plurality of positive, e.g. silver, electrodes 22, with a separator such as 24 between adjacent pairs of zinc and silver electrodes, to form either single plate or multiplate batteries.

The separator 24 can be of inorganic or organic materials, and is preferably inorganic. Inorganic separator materials which can be used include a variety of porous inorganic or ceramic substances. Thus, for example, suitable inorganic separator materials include insoluble hydrous metal oxides of zirconium, titanium and antimony. Other inorganic separators which can be employed are sintered aluminosilicates, especially the alkali metal and alkaline earth metal aluminosilicates, as described in Pat. No. 3,379,570.

Other types of inorganic separators which can be employed include those in the form of a sintered porous solid solution of magnesium silicate and a member selected from the group consisting of zinc silicate and iron silicate, including the naturally occurring magnesium-iron silicate known as the mineral Olivine, as described in Patent No. 3,446,668. An Olivine separator of this type can be prepared for example, by sintering at 1200° C. a natural Olivine consisting essentially of 41.4% $SiO_2$, 49.3% MgO and 7.7% iron oxide (FeO and $Fe_2O_3$) by weight, the remainder consisting essentially of trace amounts of CaO and $Cr_2O_3$.

Also, there can be employed the inorganic separators in the form of a sintered porous solid solution of an aluminum-bearing material such as aluminum oxide, and a substance selected from the group consisting of chromium, cobalt, nickel, magnesium, calcium and iron-bearing materials, e.g. a mixture of alumina and chromic oxide, as described in Patent No. 3,446,669.

Still another form of inorganic separator which can be employed according to the invention are porous sintered separators consisting essentially of a solid solution of a major portion of magnesium oxide and a minor proportion of an oxide such as zirconium dioxide, chromic oxide, aluminum oxide, titanium dioxide, and certain other oxides, as described in copending application Ser. No. 727,394, filed May 8, 1968 of Frank C. Arrance et al., now Patent No. 3,575,727.

Also, inorganic separator materials derived from natural chromite, termed ferrochromite, and containing oxides of iron, magnesium, aluminum and chromium and formed into a sintered solid solution, as described and claimed in copending application Ser. No. 727,678 of Frank C. Arrance, filed May 8, 1968, now Patent No. 3,539,394, can be employed.

As further examples of inorganic separator materials which can be employed are sintered zirconia (zirconium dioxide) separators, e.g. calcia stabilized zirconia, and sintered alumina separators.

Preferred inorganic separator materials are those selected from the group consisting of (a) a solid solution of magnesium silicate and iron silicate, including Olivine, (b) zirconia, (c) a solid solution of a major portion of magnesium oxide and a minor proportion of an oxide selected from the group consisting of zirconium dioxide, titanium dioxide, alumina and chromic oxide, (d) a solid solution of ferrochromite, (e) spinelloids and (f) alumina.

It will be understood that mixtures of the above materials can be employed.

The term "inorganic separator materials" or "sintered ceramic separator material" as employed herein is intended to denote any of the above noted sintered inorganic separator materials.

Although not preferred, an organic separator can be employed in a battery according to the invention. Suitable inert organic materials or plastics having suitable porosity characteristics which can be employed include, for example, microporous plastics such as nylon, Dynel (vinylchloride-acrylonitrile copolymer), Teflon (polytetrafluoroethylene), cellophane, regenerated cellulose, sausage casing and the like. Although such organic separators can be employed, the strength, chemical inertness, temperature resistance and electrode support characteristics of the inorganic or ceramic separators are significantly superior.

Also, flexible substantially inorganic separators can be employed. For example, flexible separators as described in U.S. application Ser. No. 676,223, filed Oct. 18, 1967, of Frank C. Arrance, now Patent No. 3,542,596, can be utilized in batteries according to the present invention, such flexible separators comprising a major portion of an inorganic or ceramic separator material of any of the types described above, such as Olivine, a minor portion of potassium titanate in short fiber form, and a minor portion of a cured organic polymer, e.g. polyphenylene oxide, said cured organic polymer bonding the particles of said inorganic material and the potassium titanate fibers together, and forming a porous separator structure.

Additional examples of flexible substantially inorganic separators which can be employed are those described in U.S. application Ser. No. 676,224, filed Oct. 18, 1967, of C. Berger et al., consisting essentially of a major portion of a porous inorganic material of any of the types described above, such as Olivine, and a minor portion of a water coagulable organic fluorocarbon polymer such as vinylidene fluoride polymer, said polymer bonding the particles of the inorganic material together and forming a flexible membrane.

There can also be employed flexible porous separators as described in copending application Ser. No. 707,808, filed Feb. 23, 1968, by F. C. Arrance et al., now abandoned in favor of Ser. No. 154,218, filed June 17, 1971, which can be box-shaped to provide a compartment for a battery electrode, produced by applying on a flexible porous substrate, such as flexible sheets or mats of various materials including potassium titanate paper, asbestos, aluminosilicate sheets, and the like, a film comprising a mixture of an inorganic separator material such as zirconia, and an organic polymeric bonding agent of various types, such as polyphenylene oxide, or a fluorocarbon polymer such as vinylidene fluoride polymer, bonding the particles of the inorganic material together with the bonding agent, and forming a porous substantially inorganic separator film on the flexible substrate. A further improved flexible bag separator can be used, employing a chrysotile asbestos matrix or bag initially impregnated with polyphenylene oxide, as described in the copending application Ser. No. 829,573, filed June 2, 1969, by F. C. Arrance et al.

The inorganic and organic separators as above described should be of suitable porosity such that the separator walls function to retain electrolyte, and permit transfer of electrolyte ions but prevent transfer of electrode ions. A porosity in the range of from about 5% to about 50%, and most desirably in the range of about 10% to about 30%, is generally provided.

If desired, however, other types of inorganic or organic separators can be employed.

The improved zinc electrode particularly produced according to the invention can be employed in any type of battery such as a battery employing a zinc-silver couple or a zinc-nickel couple, together with separators of the type described and illustrated above. Also, the improved zinc electrode of the invention can be employed in zinc-fluid batteries, for example the so-called zinc-air or zinc-oxygen battery, employing a gas diffusion or catalyst electrode, e.g. a platinum electrode, and there is employed at 24 in FIG. 2 an ion conducting material such as a polystyrene type ion exchange membrane or ion conducting membrane such as zirconium phosphate.

It has also been found that electrodes, e.g. a zinc electrode, can be fabricated directly from the inorganic, e.g. zinc oxide fibers produced in the invention process, by directly spraying a slurry of the above noted mixture of particulate inorganic material, plastic binder and plasticizer, if desired, in a solvent, directly on a metal, e.g. silver, current collector grid. Upon flash evaporation of the solvent, the fibers deposited upon the metal grid can be compacted to produce an efficient zinc electrode attached to the metal collector grid.

The following are examples of practice of the invention.

EXAMPLE 1

80 gms. of zirconia, 10 gms. polyphenylene oxide and 10 gms. of polypropylene polyazelate plasticizer, marketed as Plastolein P-9750, and having an average molecular weight of about 2200, are mixed with chloroform in an amount such as to provide a solvent concentration of 65% by weight of the total composition. Such mixture or slurry is ball milled to a maximum particle size of less than 10 microns.

The resulting slurry is fed to a De Vilbiss CD-2 air spray gun mounted inside a closed container, using an air pressure of about 50 p.s.i. The spraying operation is continued for a period of about 30 minutes forming fibers averaging about 0.50 inch in length, and a width ranging chiefly from about 2 to about 5 microns, although some fibers thus formed are of a width ranging up to 20 microns as result of some agglomeration. Photomicrographs of the zirconia fibers thus produced generally indicate good uniformity in appearance of the fibers. The fibers thus produced and containing polyphenylene oxide and plasticizer components are heated in a gas-air furnace to about 1000° C. for a period of about 30 minutes to burn out the organic components from the fibers. The resulting fibers free from organic residue have good strength and uniformity, and have essentially the same dimensions as noted above for the unsintered fibers.

EXAMPLE 2

The procedure of Example 1 above is repeated, employing a slurry containing 78 gms. of zinc oxide, 2 gms. of mercuric oxide, 10 gms. of polyphenylene oxide and 10 gms. Plastolein P–9750, in chloroform.

The fibers thus produced upon spraying the slurry from the air gun are similar in size (length and diameter) and structure to the zirconia fibers produced upon spraying in Example 1.

Samples of the zinc oxide fibers thus formed are heated to 900° C. in a gas-air furnace to remove organic materials. The resulting sintered zinc oxide fibers are well formed, of good strength and free from organic residue.

EXAMPLE 3

A slurry is formed comprising 80% zinc oxide, 10% polyphenylene oxide and 10% Plastolein P–9750 plasticizer in about 70% chloroform, and the slurry fed to an air spray gun to form fibers substantially as described in Example 1 above.

These fibers are pressed into an electrode form at a pressure of about 5,000 p.s.i., using a silver current collector.

The resulting electrode is assembled in a battery using two conventional silver electrodes. The negative zinc electrode is placed in a flexible separator bag formed of chrysotile asbestos (pure fuel cell grade) impregnated with 2% polyphenylene oxide and containing a 0.006" thick flexible coating comprising 80% solid solution of magnesium silicate and iron silicate, 10% cured polyphenylene oxide and 10% P–9750, the flexible separator bag containing the above noted zinc electrode being disposed between the two silver electrodes. The above noted flexible bag separator is of the type described and claimed in the above co-pending U.S. application of Arrance et al., Ser. No. 829,573, filed June 2, 1969. A 30% potassium hydroxide solution is used as electrolyte.

The battery is totally discharged at 1.0 a. (ampere) four times. The capacity is 1.3 ah. (ampere hours) for all cycles at voltage of 1.43 v. (volts). The battery is then disassembled and the zinc electrode is found to be structurally strong and intact. A test is made to determine whether the fiber structure is retained when the zinc oxide fiber is charged to zinc and discharged back to zinc oxide during the above noted cycling. Such test, carried out under a binocular microscope indicates that the fibrous structure is not destroyed as result of the above noted charge-discharge cycling.

EXAMPLE 4

The zinc oxide fibers produced by the procedure of Example 3 above, and containing polyphenylene oxide binder, are sintered at 1000° C. for 2 hours, and the sintered fiber free of organic material, are pressed into an electrode form at pressures of about 5,000 p.s.i.

The resulting zinc electrodes formed of sintered zinc oxide fibers are each placed in a flexible bag separator as described in Example 3, and such flexible separator bag containing the zinc electrode is disposed between two silver electrodes, as in Example 3, to provide a silver-zinc battery, containing potassium hydroxide electrolyte.

The batteries so formed have an average cell capacity at the start of about 2.6 ah. and an average capacity of about 1.6 ah. at the end of cycling.

Cell voltage performance is 1.46 v. initially and about 1.42 v. at the end of cycling. One cycle per day is the cycle period.

The sintered zinc oxide fibers produced as described above have a diameter averaging about 1.6 microns and have a length of up to about 250 microns.

EXAMPLE 5

The procedure of Example 1 is repeated except employing as the plastic binder butadiene-styrene rubber and polysulfone, respectively, in place of polyphenylene oxide.

The zirconia fibers thus produced upon sintering at 1000° C., according to the procedure of Example 1, have properties similar to those of the sintered zirconia fibers of Example 1.

EXAMPLE 6

The procedure of Example 1 is repeated but employing in place of zirconia in the initial slurry, the same amount of potassium titanate.

Following sintering of the resulting potassium titanate fibers thus formed according to the procedure of Example 1, sintered potassium titanate fibers are produced having properties similar to those of the sintered zirconia fibers according to Example 1.

EXAMPLE 7

A mixture of 95% zinc oxide and 5% zirconium dioxide is ball milled in a polyvinyl alcohol-water medium for 15 hours, the mixture dried at 105° C. and sintered at temperature of 900° C. for about 2 hours. The resulting sintered solid solution of zinc oxide and zirconia is granulated to 325 mesh size.

A mixture of 80 gms. of the above noted zinc oxide-zirconia solid solution granules, 10 gms. of polyphenylene oxide and 10 gms. of Plastolein P–9750 plasticizer is prepared in chloroform as solvent, employing a solvent concentration of about 70% by weight of the total composition.

The resulting slurry is then subjected to fiberizing by means of an air spray gun according to the procedure of Example 1, and the fibers so produced are subjected to sintering in a gas-air furnace at temperature of about 1000° C. for 2 hours, thus removing the organic residue.

The resulting sintered fibers are then pressed into an electrode form weighing about 6 gms. Such electrode is assembled in a batttery with a conventional silver electrode and a rigid separator composed of a solid solution of magnesium silicate and iron silicate of the type described in above Pat. 3,446,668, disposed between the two electrodes, as illustrated in FIG. 2 of the drawing.

After incorporating 30% potassium hydroxide electrolyte into the battery, the battery is charged and discharged several times and at the beginning and end of such cycling, the zinc electrode fibers are observed under a microscope to determine whether the fiber integrity is maintained during the charge-discharge cycling. At the end of this cycling regime it is observed that the fibers remain as an amorphous homogeneous mass.

EXAMPLE 8

A slurry of particulate zinc oxide, mercuric oxide, polyphenylene oxide and plasticizer in chloroform as described in Example 2 above, is sprayed by an air spray gun in accordance with procedure described in Example 1, directly onto a silver current collector grid. The homogeneous mass of fibers thus deposited on the silver grid is compacted to form a zinc electrode.

Such electrode is incorporated in a battery with a silver electrode and an inorganic separator as described in Example 6 above, and the resulting battery operates successfully as a secondary battery when subjected to charge-discharge cycling.

EXAMPLE 9

5% by weight of unsintered zirconia fibers produced in Example 1 are mixed with 95% zinc oxide powder and the mixture compressed at about 5,000 to about 10,000 p.s.i. into an electrode.

Similarly, 5% by weight of sintered zirconia fibers produced in Example 1 are mixed with 95% by weight of zinc oxide powder and the mixture compressed into electrodes in the same manner as noted above.

The respective zinc electrodes containing unsintered and sintered zirconia fibers are each incorporated in separate batteries with a conventional silver electrode and a rigid zirconia separator, the resulting battery in each case functioning efficiently as a secondary silver-zinc battery.

EXAMPLE 10

The procedure of Example 9 above is followed except that the unsintered and sintered zirconia fibers are respectively incorporated with cadmium oxide in place of the fiinc oxide to form cadmium electrodes.

These cadmium electrodes are each incorporated respectively in a separate battery containing a conventional nickel electrode and a rigid zirconia separator, the resulting batteries functioning efficiently as a secondary battery.

EXAMPLE 11

The procedure of Example 7 above is repeated, but employing in place of the zinc oxide-zirconia solid solution of the initial slurry, a zinc-oxide-barium oxide solid solution prepared by mixing equimolar ratios of zinc oxide and barium carbonate, sintering said mixture in air for about 15 hours at 1075° C. and cooling, followed by granulating the resulting sintered mixture.

Results similar to those described in Example 7 above are obtained, when the sintered fibers are pressed into an electrode and such electrode assembled in a battery with a silver electrode and the solid solution inorganic separator of Example 7.

EXAMPLE 12

The procedure of Examples 1 and 2 above is carried out, except omitting the plasticizer from the initial mixture and employing in place of the 10 gms. of such plasticizer in the mixture of each of Examples 1 and 2, an additional 10 gms. of zirconia and zinc oxide, respectively.

Results similar to Examples 1 and 2 respectively are obtained, except that the fibers formed following the initial fiberizing operation are somewhat less flexible than those of Examples 1 and 2.

EXAMPLE 13

75 gms. of zinc oxide, 5 gms. of zirconia, 10 gms. of polyphenylene oxide and 10 gms. Plastolein P-9750 plasticizer are dissolved in carbon tetrachloride using a solvent concentration of about 60% by weight of the total mixture.

The resulting slurry is fiberized as described in Example 1, and the resulting fibers are heated to 1000° C. in a gas-air furnace to remove organic material and sinter the zinc oxide-zirconia residue into a solid solution of $ZrO_2$ in ZnO. The resulting fibers are strong and well formed.

Such sintered fibers when formed into an electrode and incorporated in a battery as described in Example 7 with a silver electrode and the solid solution separator of Example 7, produce results similar to those of Example 7.

EXAMPLE 14

Unsintered and sintered fibers of zirconia as produced in Example 1 are respectively mixed with a mixture of ZnO containing a minor amount of 2% HgO, using 5% of the fibers and 96% of the ZnO—HgO mixture by weight, and the respective fiber—ZnO mixtures are compressed into 6 gm. zinc electrodes. Also, sintered and unsintered zinc oxide fibers produced according to Examples 2 and 3 are respectively compressed into 6 gm. zinc electrodes and the sintered zinc-oxide-zirconia solid solution fibers of Examples 7 and 13 are respectively compressed into 6 gm. zinc electrodes.

Each of the above zinc electrodes are tested in 1.5 ah. silver-zinc test cells using standard silver counter electrodes and a flexible inorganic separator, comprising a major portion of a solid solution of magnesium silicate and iron silicate, a minor portion of potassium titanate fibers and a minor portion of cured polyphenylene oxide as described in above copending application Ser. No. 676,223. 30% KOH is employed as electrolyte. All of these batteries are capable of total discharge cycling at a C/2 discharge and C/5 charge rate. The tests are continued until 10 total discharge cycles are completed. At the end of the cycling regime all test cells retain their original capacity and exhibit normal charging voltage.

From the foregoing, it is seen that the invention provides procedure for producing particularly strong substantially uniform inorganic or essentially inorganic fibers which can be incorporated in battery electrodes to provide electrodes of improved strength free from slumping and change of shape, having durability and good electrical performance, particularly zinc electrodes having these characteristics.

While I have described particular embodiments of my invention for purposes of illustration, it will be understood that various modifications and adaptations thereof may be made within the spirit of the invention, and hence the invention is not to be taken as limited except by the scope of the appended claims.

I claim:

1. Strong flexible essentially inorganic fibers particularly adapted for the fabrication of electrodes, containing particulate inorganic material and a plastic binder in a proportion of about 10 to about 50% by weight of total solids, bonding the particles of inorganic material together to form a fiber, said inorganic material selected from the group consisting of titanates, zirconia, alumina, aluminosilicates, zinc oxide, beryllium oxide and $$ZrO_2 \cdot SiO_2$$

and solid solutions of zinc oxide with a metal selected from the group consisting of Zr, Sn, Ti, Cr, V, Co, Fe, Al, Ga, Y, Sc, Ni, Mn, La, Ce, Ba, Mg, Cu, Ag and Li.

2. Strong flexible essentially inorganic fibers as defined in claim 1, including a plasticizer as an aid in flexibilizing said fibers.

3. Strong flexible essentially inorganic fibers as defined in claim 1, said plastic binder being selected from the group consisting of polyphenylene oxide, polysulfone, butadiene-styrene rubber, neoprene and polystyrene.

4. Strong flexible essentially inorganic fibers as defined in claim 3, including a plasticizer selected from the group consisting of monomeric and polymeric azelate, pelargonate and oleate esters.

5. Strong flexible essentially inorganic fibers as defined in claim 1, said inorganic material being selected from the group consisting of zinc oxide and zirconia.

6. Strong flexible essentially inorganic fibers as defined in claim 5, said plastic binder being polyphenylene oxide.

7. Strong flexible essentially inorganic fibers as defined in claim 6, including polypropylene polyazelate as plasticizer.

8. Strong flexible essentially inorganic fibers as defined in claim 6, said inorganic material being a solid solution of zinc oxide and zirconia.

9. Strong flexible inorganic fibers of claim 1, sintered and free of organic components.

10. Strong flexible inorganic fibers of claim 5, sintered and free of organic components.

11. Strong flexible inorganic fibers of claim 8, sintered and free of organic components.

12. A battery electrode comprising a fibrous structure and containing strong flexible fibers selected from the group consisting of (a) essentially inorganic fibers containing particulate inorganic material and a plastic binder in a proportion of about 10 to about 50% by weight of total solids, bonding the particles of inorganic material together, to form a fiber, and (b) flexible inorganic fibers as defined in (a) which are sintered and free of organic components, said inorganic material selected from the group consisting of titanates, zirconia, alumina, aluminosilicates, zinc oxide, beryllium oxide and $ZrO_2 \cdot SiO_2$, and solid solutions of zinc oxide with a metal selected from the group consisting of Zr, Sn, Ti, Cr, V, Co, Fe, Al, Ga, Y, Sc, Ni, Mn, La, Ce, Ba, Mg, Cu, Ag and Li, said plastic binder being selected from the group consisting of polyphenylene oxide, polysulfone, butadiene-styrene rubber, neoprene and polystyrene.

13. A battery electrode as defined in claim 12, said inorganic material being selected from the group consisting of zinc oxide and zirconia, and said plastic binder being polyphenylene oxide.

14. A battery electrode as defined in claim 13, said fibers (a) including a plasticizer as an aid in flexibilizing said fibers.

15. A battery electrode as defined in claim 12, said electrode consisting essentially of zinc oxide with said flexible fibers uniformly mixed therein, said inorganic material of said fibers being zirconia, and said fibers (a) containing polyphenylene oxide as plastic binder.

16. A battery electrode as defined in claim 12, said electrode consisting essentially of said flexible fibers compacted into an electrode form, said inorganic material of said fibers being a solid solution of zinc oxide and zirconia, and said fibers (a) containing polyphenylene oxide.

17. A battery electrode as defined in claim 12, said electrode consisting essentially of said flexible fibers compacted into an electrode form, said inorganic material of said fibers being zinc oxide, and said fibers (a) containing polyphenylene oxide.

18. A battery comprising a pair of electrodes of opposite polarity and a porous separator between said electrodes for retaining electrolyte and permitting transfer of electrolyte ions while preventing migration of electrode ions, at least one of said electrodes being an electrode as defined in claim 12.

19. A battery comprising a pair of electrodes of opposite polarity and a porous separator between said electrodes for retaining electrolyte and permitting transfer of electrolyte ions while preventing migration of electrode ions, at least one of said electrodes being an electrode comprising a fibrous structure and consisting essentially of strong flexible fibers compacted into an electrode form, said fibers selected from the group consisting of (a) essentially inorganic fibers containing particulate inorganic material consisting of a solid solution of zinc oxide and zirconia, and polyphenylene oxide bonding the particles of inorganic material together, and (b) flexible inorganic fibers as defined in (a) which are sintered and free of organic components.

20. A battery comprising a pair of electrodes of opposite polarity and a porous separator between said electrodes for retaining electrolyte and permitting transfer of electrolyte ions while preventing migration of electrode ions, at least one of said electrodes being an electrode comprising a fibrous structure and consisting essentially of strong flexible fibers compacted into an electrode form, said fibers selected from the group consisting of (a) essentially inorganic fibers containing particulate inorganic material consisting of zinc oxide, and polphenylene oxide bonding the particles of inorganic material together, and (b) flexible inorganic fibers as defined in (a) which are sintered and free of organic components.

21. A battery comprising a pair of electrodes of opposite polarity and a porous separator between said electrodes for retaining electrolyte and permitting transfer of electrolyte ions while preventing migration of electrode ions, at least one of said electrodes being an electrode as defined in claim 13.

22. A battery comprising a pair of electrodes of opposite polarity and a porous separator between said electrodes for retaining electrolyte and permitting transfer of electrolyte ions while preventing migration of electrode ions, at least one of said electrodes being an electrode as defined in claim 14.

23. A battery comprising a pair of electrodes of opposite polarity and a porous separator between said electrodes for retaining electrolyte and permitting transfer of electrolyte ions while preventing migration of electrode ions, at least one of said electrodes being an electrode as defined in claim 15.

References Cited

UNITED STATES PATENTS

| | | | |
|---|---|---|---|
| 3,054,761 | 9/1962 | Moore et al. | 260—2.5 |
| 3,542,596 | 11/1970 | Arrance | 136—6 |
| 3,453,149 | 7/1969 | Adlhart et al. | 136—153 |
| 3,489,610 | 1/1970 | Berger et al. | 136—6 |
| 3,266,936 | 8/1966 | Krebs | 136—53 |
| 3,087,233 | 4/1963 | Turnbull | 29—182 |
| 3,436,269 | 4/1969 | Mitoff | 136—86 F |
| 3,446,668 | 5/1969 | Arrance et al. | 136—6 |
| 3,476,601 | 11/1969 | Berger et al. | 136—6 |
| 3,565,691 | 2/1971 | Strier et al. | 136—146 |

ANTHONY SKAPARS, Primary Examiner

U.S. Cl. X.R.

136—120 R, 146